(12) United States Patent
Schulte (10) Patent No.: US 9,136,886 B2
(45) Date of Patent: Sep. 15, 2015

(54) DIGITALLY COMPENSATED PROCESS TRANSMITTER WITH MINIMAL DEAD TIME

(71) Applicant: Rosemount Inc., Chanhassen, MN (US)

(72) Inventor: John Paul Schulte, Eden Prairie, MN (US)

(73) Assignee: Rosemount Inc., Bloomington, MN (US)

( * ) Notice: Subject to any disclaimer, the term of this patent is extended or adjusted under 35 U.S.C. 154(b) by 148 days.

(21) Appl. No.: 13/792,659

(22) Filed: Mar. 11, 2013

(65) Prior Publication Data

US 2014/0254717 A1 Sep. 11, 2014

(51) Int. Cl.
*H04L 25/03* (2006.01)
*H04B 1/04* (2006.01)

(52) U.S. Cl.
CPC ..................................... *H04B 1/0475* (2013.01)

(58) Field of Classification Search
CPC ....... G01D 3/0365; G01D 21/00; G01D 3/08; H04L 25/49
See application file for complete search history.

(56) References Cited

U.S. PATENT DOCUMENTS

| | | | |
|---|---|---|---|
| 6,308,106 B1 | 10/2001 | Ameri et al. | |
| 6,445,969 B1 | 9/2002 | Kenney et al. | |
| 6,496,749 B1 | 12/2002 | Yamaguchi et al. | |
| 6,782,296 B2 | 8/2004 | Hoche | |
| 7,092,848 B2 | 8/2006 | Hoff et al. | |
| 8,326,550 B2 | 12/2012 | Shimakata et al. | |
| 2003/0023325 A1 | 1/2003 | Adachi et al. | |
| 2007/0043451 A1 | 2/2007 | Geyer | |
| 2009/0196374 A1 | 8/2009 | Schulte et al. | |
| 2009/0198118 A1 | 8/2009 | Hayter et al. | |
| 2010/0189042 A1 | 7/2010 | Pan | |
| 2013/0241757 A1* | 9/2013 | Morris | 341/144 |

OTHER PUBLICATIONS

International Search Report and Written Opinion dated Jun. 11, 2014, for PCT/US2014-017978.

* cited by examiner

*Primary Examiner* — Shuwang Liu
*Assistant Examiner* — David S Huang
(74) *Attorney, Agent, or Firm* — Kinney & Lange, P.A.

(57) ABSTRACT

A processor transmitter includes a sensor, a first signal path, a second signal path, and an output summing circuit. The sensor produces a process signal that is a function of a process parameter. The first signal path digitally compensates the process signal. The second signal path digitally filters the process signal and subjects the process signal to less delay than the first signal path. The output summing circuit sums the digitally compensated process signal from the first signal path and the digitally filtered process signal from the second signal path to produce a fast digital compensated process signal.

20 Claims, 7 Drawing Sheets

DIGITALLY COMPENSATED PROCESS TRANSMITTER WITH MINIMAL DEAD TIME

BACKGROUND

The present invention relates to process transmitters. In particular, the present invention is a process transmitter featuring digital compensation with improved dynamic performance.

Process transmitters are used to monitor industrial process parameters (or process variables) such as differential pressure, gage pressure, absolute pressure, fluid flow, liquid level, temperature, pH, etc. Modern high performance process transmitters use digital signal compensation to achieve low total error. Uncompensated process signals are digitized using an analog-to-digital (A/D) converter and passed to a microcontroller for digital compensation. Ambient temperature information is also digitized and passed to the microcontroller for the purpose of temperature compensation. Factory characterization produces correction coefficients that allow the device output to be very linear and temperature compensated, which provides a very low total error for static input conditions.

One consequence of this digital compensation scheme has been a sacrifice in dynamic performance. The A/D process in addition to the digital compensation process adds a significant amount of dead time to the transmitter. Typical process transmitters with digital compensation may have dead times ranging from 100 mS to 500 mS. Dead time may be problematic for applications which require fast control loops such as pulp/paper head box pressure control, or emergency shut-down applications.

Process transmitters dating back to the 1970's were all analog in nature. Lacking A/D converters and digital processors, these devices had virtually no dead time, and responded very rapidly to dynamic input signals. Unfortunately, their total performance was poor by today's standards.

There is a need for process transmitters that offer the static performance of a digitally compensated device, and the dynamic performance of an all analog device that is free of dead time.

SUMMARY

In one aspect of the invention, a process transmitter includes a sensor, a first signal path, a second signal path, and an output summing circuit. The sensor produces a process signal that is a function of a process parameter. The first signal path digitally compensates the process signal. The second signal path digitally filters the process signal and subjects the process signal to less delay than the first signal path. The output summing circuit sums the digitally compensated process signal from the first signal path and the digitally filtered process signal from the second signal path to produce a fast digital compensated process signal.

In another aspect, a process transmitter includes a sensor, an analog-to-digital converter, a first digital low pass filter, a second digital low pass filter, a digital processor, an inversion circuit, a matching circuit, an intermediate summing circuit, and an output circuit. The sensor produces a process signal that is a function of a process parameter. The analog-to-digital converter digitizes the process signal to produce a digital process signal. The first digital low pass filter filters the digital process signal to produce a fast filtered process signal. The second digital low pass filter filters the fast filtered process signal to produce a slow filtered process signal, the second digital low pass filter having a lower update frequency than the first digital low pass filter. The digital processor digitally compensates the slow filtered process signal to produce a digitally compensated process signal; the digital processor creating a delay in the digitally compensated process signal. The inversion circuit inverts the slow filtered process signal to produce an inverted process signal. The matching circuit creates a delay in the inverted process signal to produce a delayed inverted process signal. The intermediate summing circuit sums the fast filtered process signal and the delayed inverted process signal to produce a digitally filtered process signal. The output summing circuit sums the digitally filtered process signal and the compensated process signal to produce a fast digital compensated process signal.

DETAILED DESCRIPTION

One solution for providing process transmitters that offer the static performance of a digitally compensated device and the dynamic performance of an all analog device that is nearly free of dead time is described in U.S. Patent Publication 2009/0196374, MINIMAL DEAD TIME DIGITALLY COMPENSATED PROCESS TRANSMITTER. The reference describes a process transmitter having an analog process signal path in parallel with a digitally compensated process signal path. The digitally compensated signal path includes a digital-to-analog converter prior to an output circuit. The two signal paths join at the output circuit.

The present invention is a process transmitter having a high-speed digital process signal path and a digitally compensated process signal path. The two digital signal paths join prior to digital-to-analog conversion. The use of an all-digital filtering scheme, as described below, produces an excellent dynamic response to changes in a sensed process parameter. The all-digital architecture is also a cost-effective way to provide the fast dynamic response of an analog transmitter, the low total error of a digitally compensated transmitter, and a dynamic response closely matching the sensor output.

Figure 1:
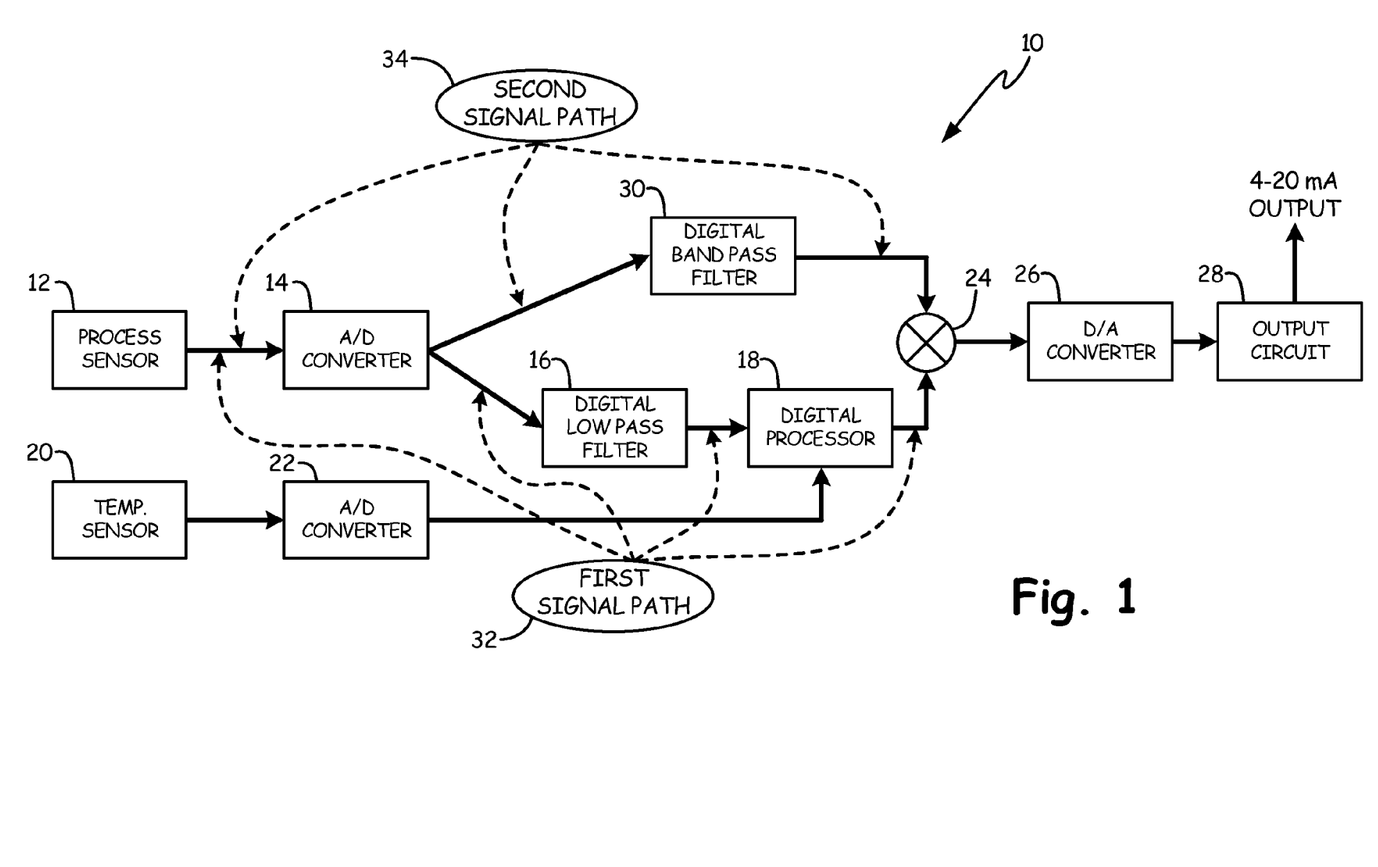
FIG. 1 is a block diagram of a process transmitter illustrating an embodiment of the present invention.

FIG. 1 is a block diagram of a digitally compensated process transmitter embodying the present invention. FIG. 1 depicts a block diagram of process transmitter 10, including process sensor 12, analog-to-digital (A/D) converter 14, digital low pass filter 16, digital processor 18, temperature sensor 20, analog-to-digital (A/D) converter 22, output summing circuit 24, digital-to-analog (D/A) converter 26, output circuit 28, and digital band pass filter 30.

Process sensor 12 produces a process signal that varies as a function of a process variable, such as differential pressure, absolute pressure, gage pressure, fluid temperature, liquid level, flow rate, etc. A/D converter 14 is preferably a sigma delta modulator. Digital low pass filter 16 is a decimating filter. Digital processor 18 is typically a microprocessor. Temperature sensor 20 produces a temperature signal that varies as a function of an ambient temperature of process transmitter 10. Output summing circuit 24 is a circuit for producing a single digital output signal that results from summing two digital input signals. Output circuit 28 interfaces process transmitter 10 by generating a transmitter output signal responsive to an analog input signal. In a typical system in which process transmitter 10 is connected to a two-wire loop, output circuit 28 modulates a current flow that may vary between 4 milliamps (zero) to 20 milliamps (full scale) to generate the transmitter output signal. Digital band pass filter 30 is a decimating filter.

Process sensor 12 is connected to A/D converter 14, which is connected to both digital low pass filter 16 and digital band pass filter 30. Digital low pass filter 16 is connected to digital processor 18. Both digital band pass filter 30 and digital processor 18 are connected to output summing circuit 24. D/A converter 26 connects output summing circuit 24 to output circuit 28. Temperatures sensor 20 is connected to A/D converter 22, which is connected to digital processor 18.

In operation, an analog process signal from process sensor 12 is digitized by A/D converter 14. The output of A/D converter 14 is a high speed, low resolution digital process signal. For example, the digital process signal from A/D converter 14 may be a 50 kHz, 1 bit data stream. The output of A/D converter 14 is split, passing to digital low pass filter 16 and to digital band pass filter 30. At digital low pass filter 16, the data rate of the digital process signal is reduced from, for example, 50 kHz to 25 Hz, to produce a slow filtered process signal. In doing so, digital low pass filter 16 eliminates almost all of the noise present in the digital process signal from A/D converter 14. The slow filtered process signal from digital low pass filter 16 is provided to digital processor 18 for digital compensation. Digital processor 18 executes a correction algorithm to digitally compensate the slow filtered process signal by at least one of linearization, line pressure compensation, and temperature compensation. Digital processor 18 may have relatively limited computational resources. The complexity of the correction algorithm may add a dead time delay of up to 15 mS due to the limited resources of digital processor 18. Temperature compensation is based upon an ambient temperature signal from ambient temperature sensor 20, which is digitized by A/D converter 22 and provided to digital processor 18.

Meanwhile, at digital band pass filter 30, the data rate of the digital process signal is also reduced, but not nearly as much as at digital low pass filter 16, to produce a fast filtered process signal. For example, digital band pass filter 30 may reduce the rate of the digital process signal from, for example, 50 kHz to 100 Hz. The fast filtered process signal is a digitally filtered process signal. The digitally compensated process signal from digital processor 18 and the digitally filtered process signal from digital band pass filter 30 are summed at output summing circuit 24 to produce a fast digital compensated process signal. The digital compensated process signal is converted to an analog compensated process signal by D/A converter 26. Output circuit 28 produces a transmitter output response to the analog compensated process signal from D/A converter 26.

Alternatively, A/D converter 14 may be any analog-to-digital converter that produces a fast update. For example, A/D converter 14 may be a successive approximation register A/D converter operating at a conversion rate of 100 Hz. In this case, digital band pass filter 30 need not be a decimating filter.

As shown in FIG. 1, process transmitter 10 includes two signal paths connecting process sensor 12 and output summing circuit 24: first signal path 32 and second signal path 34.

First signal path 32 includes A/D converter 14, digital low pass filter 16, and digital processor 18. Second signal path 34 includes A/D converter 14, and digital band pass filter 30. Along first signal path 32, the process signal is digitally filtered and digitally compensated to produce the digitally compensated process signal. Along second signal path 34, the process signal is digitally filtered to produce the digitally filtered process signal. Importantly, the process signal along second signal path 34 is not delayed by nearly as much as the process signal along first signal path 32. Digital band pass filter 30 passes some of the digital process signal directly from A/D converter 14 to D/A converter 26 by way of output summing circuit 24, so that the transmitter output from output circuit 28 includes the high speed response inherent in the high speed signal along second signal path 34. The high frequency cutoff of digital band pass filter 30 is set to pass a desired portion of the high speed signal, but block noise that exists above the frequency of interest. The low frequency cutoff of digital band pass filter 30 is set to block portions of the high speed signal below a level indicative of a dynamic change in the process signal.

In response to a dynamic change in the process signal, the process signal passes along second signal path 34 to D/A converter 26 at a very fast rate of, for example, 100 Hz, to provide a fast dynamic response that is nearly free of dead time. As the dynamic change stabilizes, the process signal along second signal path 34 begins to decay while, at the same time, the process signal along first signal path 32 begins to respond. Digital band pass filter 30 is selected such that the output of digital band pass filter 30 decays from its initial dynamic response condition (greater than zero) to its final static output condition (zero), while at the same time the output of digital low pass filter 16 decays from its initial dynamic response condition (zero) to its final static output condition (greater than zero). This synchronization, or decay match, results in the decaying portion of the digitally filtered process signal from digital band pass filter 30 cancelling out the decaying portion digitally compensated process signal from digital processor 18 when summed at output summing circuit 24. As the process signal approaches static conditions, only the process signal along first signal path 32 remains to provide the desired digitally compensated process signal. As a result, the fast digital compensated process signal from output summing circuit 24 settles to its static value significantly earlier than either of digital low pass filter 16 or digital band pass filter 30 settle. In this way, process transmitter 10 offers the static performance of a digitally compensated device and the fast dynamic performance of an all analog device that is nearly free of dead time.

Compensation of the process signal is computationally intensive and difficult to achieve at a fast rate, such as 100 Hz. In this embodiment, compensation is executed at a slower rate, such as 25 Hz, along first signal path 32. In contrast, the digital filtering by digital band pass filter 30 and the summing by output summing circuit 24 are not computationally intensive and can be easily done at the fast rate. The output of output summing circuit 24 follows the fast rate, resulting in a fast update rate to D/A converter 26 and output circuit 28. The dynamic portion of the process signal typically has a required maximum total error of 5% of span. This level of performance is easily provided in the uncompensated signal from many process sensors. As a result, the computational resources of digital processor 18 are conserved.

Although FIG. 1 shows digital low pass filter 16, digital processor 18, digital band pass filter 30, and output summing circuit 24 as separate elements, it is understood that these block functions may be implemented as software operating on one or more integrated circuits, such as a host processor. In such embodiments, because the digital filtering by digital band pass filter 30 and the summing by output summing circuit 24 are not computationally intensive, they introduce modest additional computational burden on such a host processor.

In some embodiments, process signals may be adjusted prior to D/A converter 26 such that the transmitter output is within a range, or scale, determined by a customer calibration of upper and lower range values. This is commonly referred to as scaling. Advantageously, because the digitally compensated process signal from first signal path 32 and the digitally filtered process signal from second signal path 34 are summed before D/A converter 26, proper scaling may be performed on the single summed output—the fast digital compensated process signal—of output summing circuit 24.

Figure 2A:
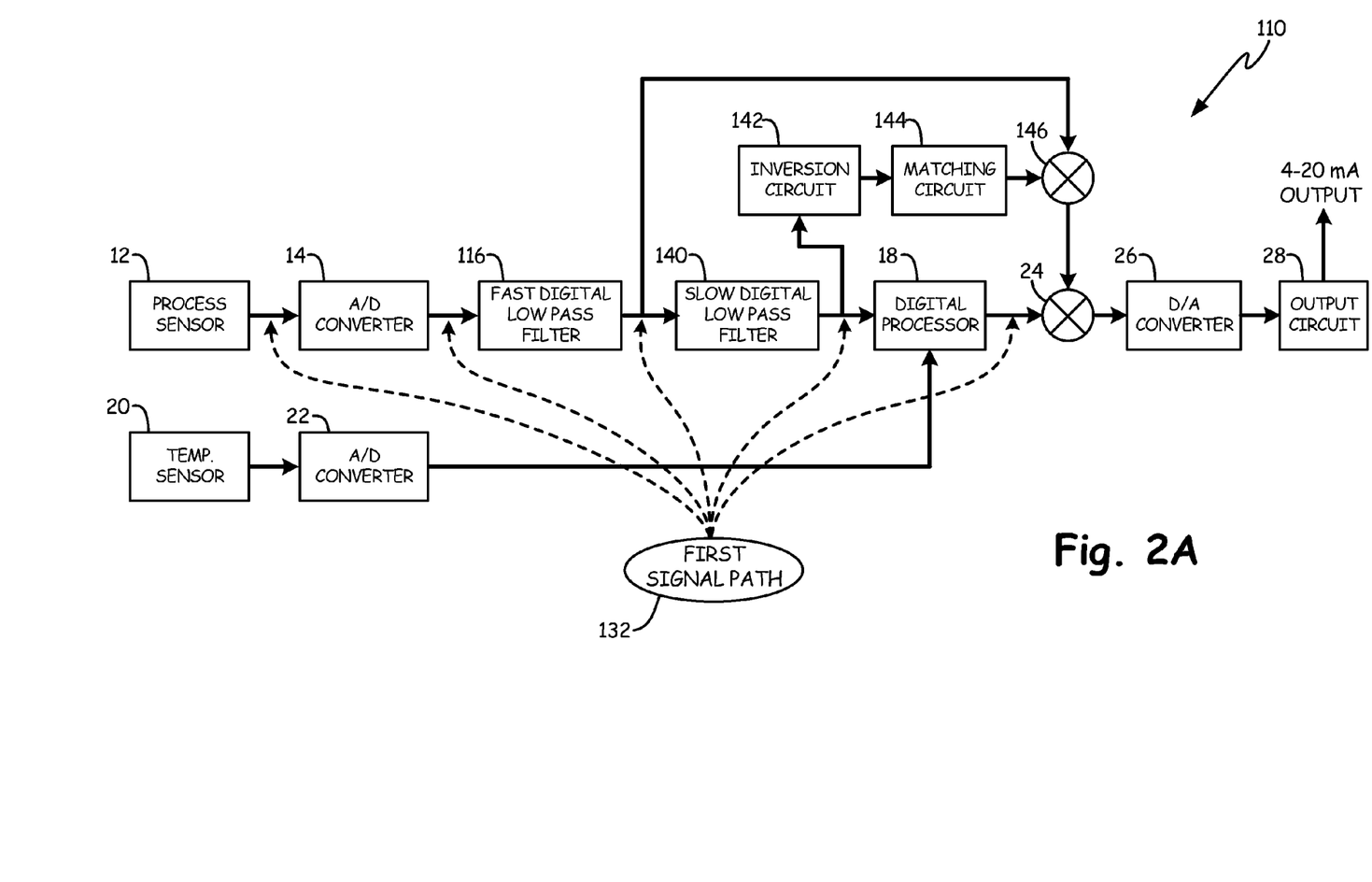
FIGS. 2A-2C are block diagrams of a process transmitter illustrating another embodiment of the present invention.
Figure 2B:
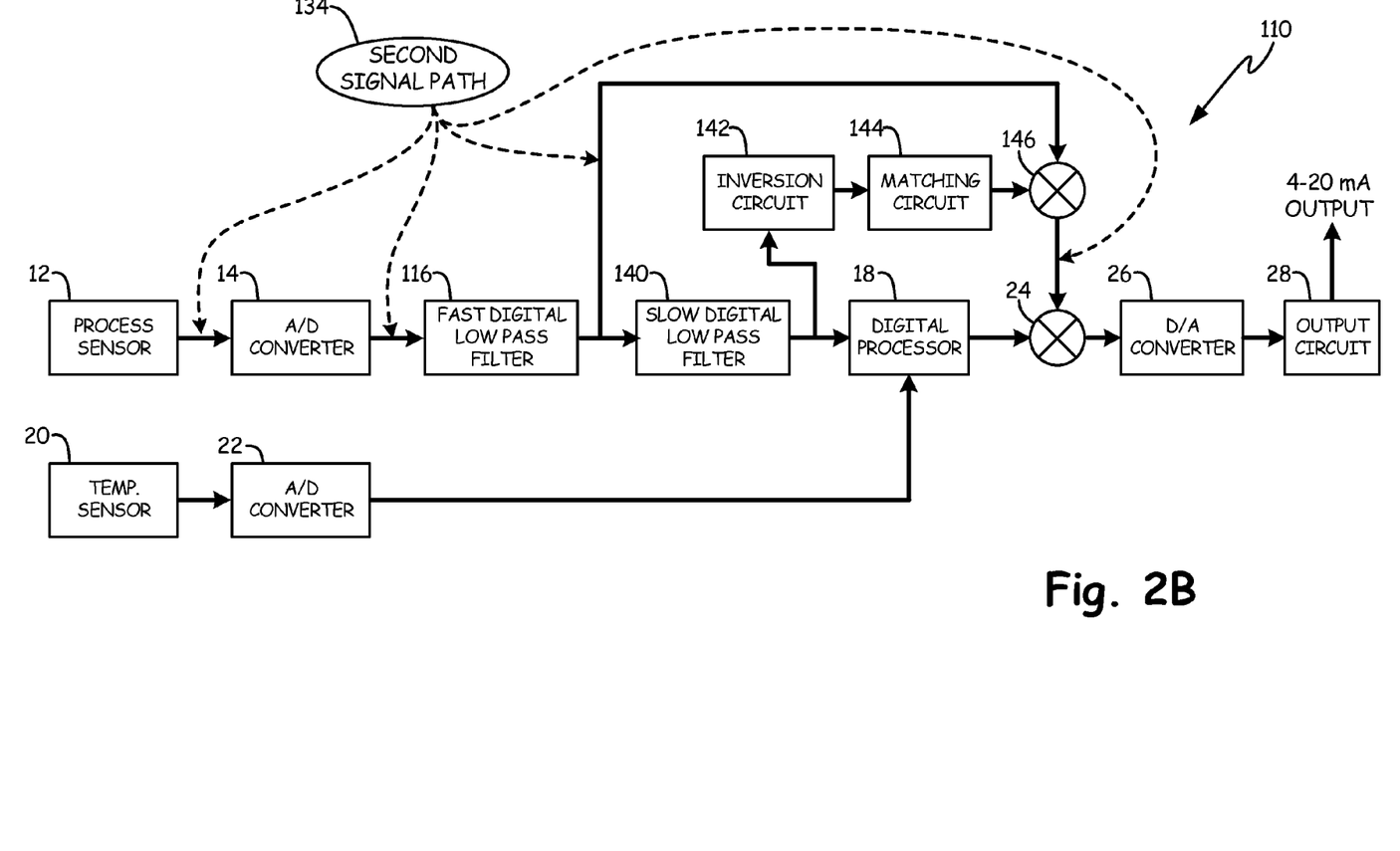
Figure 2C:
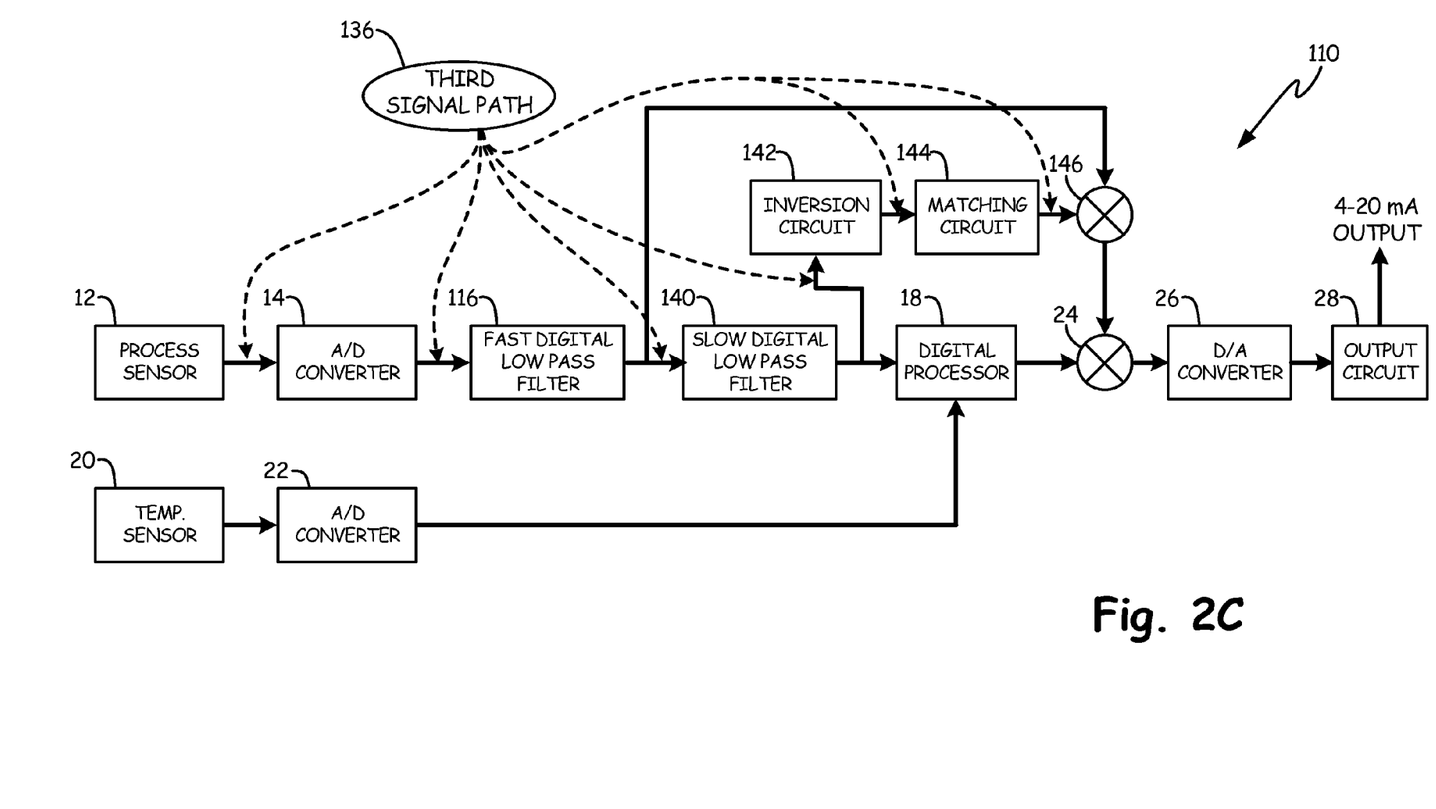

FIGS. 2A-2C are block diagrams of another digitally compensated process transmitter embodying the present invention. In contrast to the embodiment of FIG. 1, the embodiment of FIGS. 2A-2C includes a third signal path for improving fidelity in the dynamic response of a process transmitter. For clarity, each of FIGS. 2A-2C identifies one of three signal paths: FIG. 2A identifies first signal path 132, FIG. 2B identifies second signal path 134, and FIG. 2C identifies third signal path 136. Each of FIGS. 2A-2C depicts a block diagram of process transmitter 110, including process sensor 12, analog-to-digital (A/D) converter 14, digital processor 18, temperature sensor 20, analog-to-digital (A/D) converter 22, output summing circuit 24, digital-to-analog (D/A) converter 26, and output circuit 28 as described above in reference to FIG. 1. Process transmitter 110 further includes fast digital low pass filter 116, slow digital low pass filter 140, inversion circuit 142, matching circuit 144, and intermediate summing circuit 146.

Fast digital low pass filter 116 is a decimating filter operating at a fast rate of, for example, 100 Hz. Slow digital low pass filter 140 is also a decimating filter, but it operates at much slower rate of, for example, 25 Hz. Inversion circuit 142 is a circuit that inverts a signal. Matching circuit 144 is a circuit that delays a signal by an adjustable amount. Intermediate summing circuit 146 is a circuit for producing a single digital output signal that results from summing two digital input signals.

Process sensor 12 is connected to A/D converter 14, which is connected to fast digital low pass filter 116. Fast digital low pass filter 116 is connected to both slow digital low pass filter 140 and intermediate summing circuit 146. Slow digital low pass filter 140 is connected to both inversion circuit 142 and digital processor 18. Inversion circuit 142 is connected to matching circuit 144, which is connected to intermediate summing circuit 146. Both intermediate summing circuit 146 and digital processor 18 are connected to output summing circuit 24. D/A converter 26 connects output summing circuit 24 to output circuit 28. Temperature sensor 20 is connected to A/D converter 22, which is connected to digital processor 18.

In operation, an analog process signal from process sensor 12 is digitized by A/D converter 14. The output of A/D converter 14 is a high speed, low resolution digital process signal. For example, the digital process signal from A/D converter 14 may be a 50 kHz, 1 bit data stream. The output of A/D converter 14 passes to fast digital low pass filter 116 where the digital process signal is reduced from, for example, 50 kHz to 100 Hz. This filtering eliminates much of the noise present in the digital process signal from A/D converter 14, and produces a fast filtered process signal. The fast filtered process signal is split, passing to slow digital low pass filter 140 and to intermediate summing circuit 146. At slow digital low pass filter 140, the data rate of the fast filtered process signal is again reduced, for example, from 100 Hz to 25 Hz, producing a slow filtered process signal. In doing so, slow digital low pass filter 140 eliminates almost all of the noise remaining in the fast filtered process signal from fast digital low pass filter 116. The slow filtered process signal from slow digital low pass filter 140 is split, passing to inversion circuit 142 and to digital processor 18. Digital processor 18 executes a correction algorithm to digitally compensate the slow filtered process signal by at least one of linearization, line pressure compensation, and temperature compensation. Execution of the algorithm creates a compensation delay in the slow filtered process signal. Temperature compensation is based upon an ambient temperature signal from ambient temperature sensor 20, which is digitized by A/D converter 22 and provided to digital processor 18.

Meanwhile, at inversion circuit 142, the slow filtered process signal from slow digital low pass filter 140 is inverted and passed to matching circuit 144. Matching circuit 144 delays the inverted process signal from inversion circuit 142 and passes it to intermediate summing circuit 146. The delay of matching circuit 144 is adjusted to match the compensation delay caused by digital processor 18. Preferably, the delay of matching circuit 144 is controlled by digital processor 18 to ensure a match to the compensation delay. At intermediate summing circuit 146, the delayed and inverted process signal from matching circuit 144 is added to the fast filtered process signal received directly from fast digital low pass filter 116 to produce a digitally filtered process signal. The digitally filtered process signal from intermediate summing circuit 146 is passed to output summing circuit 24. The digitally compensated process signal from digital processor 18 and the digitally filtered process signal from intermediate summing circuit 146 are summed at output summing circuit 24 to produce a fast digital compensated process signal. The fast digital compensated process signal is converted to an analog compensated process signal by D/A converter 26. Output circuit 28 produces a transmitter output response to the analog compensated process signal from D/A converter 26.

As with the embodiment of FIG. 2, A/D converter 14 is preferably a sigma delta modulator. Alternatively, A/D converter 14 may be any analog-to-digital converter that produces a fast update. For example, A/D converter 14 may be a successive approximation register A/D converter operating at a conversion rate of 100 Hz. In this case, fast digital low pass filter 116 need not be a decimating filter.

Considering FIGS. 2A-2C together, process transmitter 110 includes three signal paths connecting process sensor 12 and output summing circuit 24: first signal path 132, second signal path 134, and third signal path 136. First signal path 132 includes A/D converter 14, fast digital low pass filter 116, slow digital low pass filter 140, and digital processor 18. Second signal path 134 includes A/D converter 14, fast digital low pass filter 116, and intermediate summing circuit 146. Third signal path 136 includes A/D converter 14, fast digital low pass filter 116, slow digital low pass filter 140, inversion circuit 142, matching circuit 144, and intermediate summing circuit 146. Along first signal path 132, the process signal is digitally compensated to produce the digitally compensated process signal. Along second signal path 134, the process signal is digitally filtered to produce the fast filtered process signal. Importantly, the process signal along second signal path 134 is not delayed by nearly as much as the process signal along first signal path 132. Second signal path 134 passes some of the digital process signal directly from A/D converter 14 to D/A converter 26 and output circuit 28, so that the transmitter output inherits the high speed response inherent in the high speed signal along second signal path 134. Along third signal path 136, the slow filtered process signal is inverted so that the dynamic response of the inverted process signal opposes the dynamic response of the fast filtered process signal from second signal path 134 when the two are added together at intermediate summing circuit 146. The delay along third signal path 136 is synchronized to match the compensation delay from digital processor 18 on first path 132.

In response to a dynamic change in the process signal, the process signal passes along second signal path 134 to D/A converter 26 at a fast rate of 100 Hz to provide a fast dynamic response that is nearly free of dead time. As the dynamic change stabilizes, the process signal along third signal path 136 begins to respond and cancel out the process signal from second signal path 134 as the process signal along first signal path 132 begins to respond. As the process signal approaches static conditions, the process signals from second signal path 134 and third signal path 136 cancel out so that only the process signal along first signal path 132 remains to provide the desired digitally compensated process signal.

In the embodiment of FIGS. 2A-2C, inversion circuit 142 connects slow digital low pass filter 140 to matching circuit 144. However, it is understood that the present invention encompasses embodiments where inversion circuit 142 and matching circuit 144 are interchanged, such that matching circuit 144 connects slow digital low pass filter 140 to inversion circuit 142, and inversion circuit 142 is connected to intermediate summing circuit 146 so that the delayed inverted process signal passes from inversion circuit 142 to intermediate summing circuit 146. It is not a significant matter for the purposes of the present invention whether the digitally filtered process signal passing along third signal path 136 is inverted, and then delayed; or delayed, and then inverted. Thus, the present invention also includes embodiments where the inversion function of inversion circuit 142 and the summation function of intermediate summing circuit 146 are combined into a single function that is a negative summation (difference) between the slow filtered process signal from third signal path 136 and the fast filtered process signal from second signal path 134, rather than a positive summation.

The embodiment of FIGS. 2A-2C includes all of the advantages of the embodiment described above in reference to FIG. 1. Importantly in this embodiment, because the delay along third signal path 136 is synchronized to match the compensation delay from digital processor 18 on first path 132, the actual compensation delay not need to be known, so long as digital processor 18 and matching circuit 144 are synchronized. Process transmitter 110 offers the static performance of a digitally compensated device, and the dynamic performance of an all analog device that is nearly free of dead time. In addition, with the close matching provided for in this embodiment, process transmitter 110 offers an overall dynamic response closely following the dynamic characteristics of process sensor 12, as illustrated in FIG. 3.

Although FIGS. 2A-2C show fast digital low pass filter 116, slow digital low pass filter 140, inversion circuit 142, matching circuit 144, intermediate summing circuit 146, digital processor 18, and output summing circuit 24 as separate elements, it is understood that these block functions may be implemented as software operating on one or more integrated circuits, such as a host processor. In such embodiments, because the operations of fast digital low pass filter 116, slow digital low pass filter 140, inversion circuit 142, matching circuit 144, intermediate summing circuit 146, and output summing circuit 24 are not computationally intensive, they introduce modest additional computational burden on such a host processor.

Figure 3:
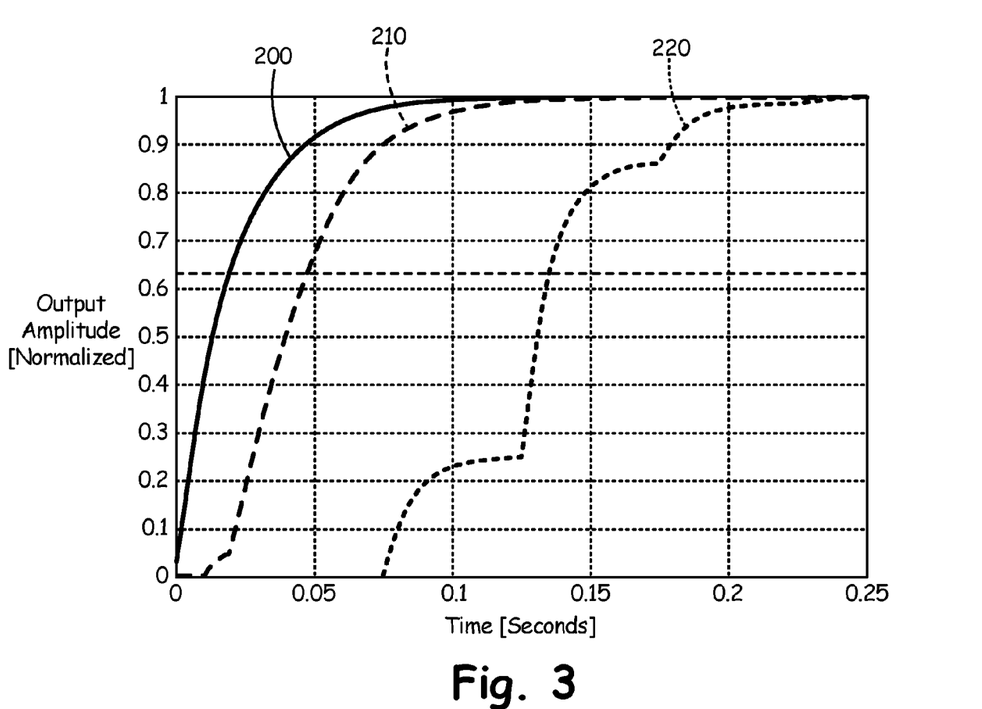
FIG. 3 is a plot of normalized output as a function of time comparing an output of the process transmitter of FIGS. 2A-2C to an output of a prior art process transmitter in response to a step input.

FIG. 3 is a plot of normalized output as a function of time comparing an output of process transmitter 110 to an output of a prior art process transmitter that does not embody the present invention. The simulated outputs are in response to a step input to sensor 12 from zero to one. FIG. 3 shows sensor response 200, process transmitter response 210, and prior art response 220. Sensor response 200 is a normalized step output of sensor 12 prior to A/D converter 14. Process transmitter response 210 is a normalized output of process transmitter 110 in response to the normalized step output of sensor 12. Prior art response 220 is a normalized output of the prior art transmitter in response to the normalized step output of sensor 12. Sensor response 200 shows a response reaching 63% in about 20 mS without any dead time. Prior art response 220 shows a response reaching 63% in about 140 mS with approximately 75 mS of dead time. Process transmitter response 210 shows a response reaching 63% in about 45 mS with almost no dead time, a mere 10 mS. Thus, process transmitter response 210 shows that process transmitter 110, which offers the static performance of a digitally compensated device, has the dynamic performance of an analog process transmitter that is nearly free of dead time. In addition, the shape of process transmitter response 210 follows that of sensor response 200 with much greater fidelity than prior art transmitter response 220, making process transmitter 110 appear even more like an analog process transmitter, while retaining the static performance of a digitally compensated device. Notably, all of this is achieved in the present invention with a modest additional computational burden.

Figure 4:
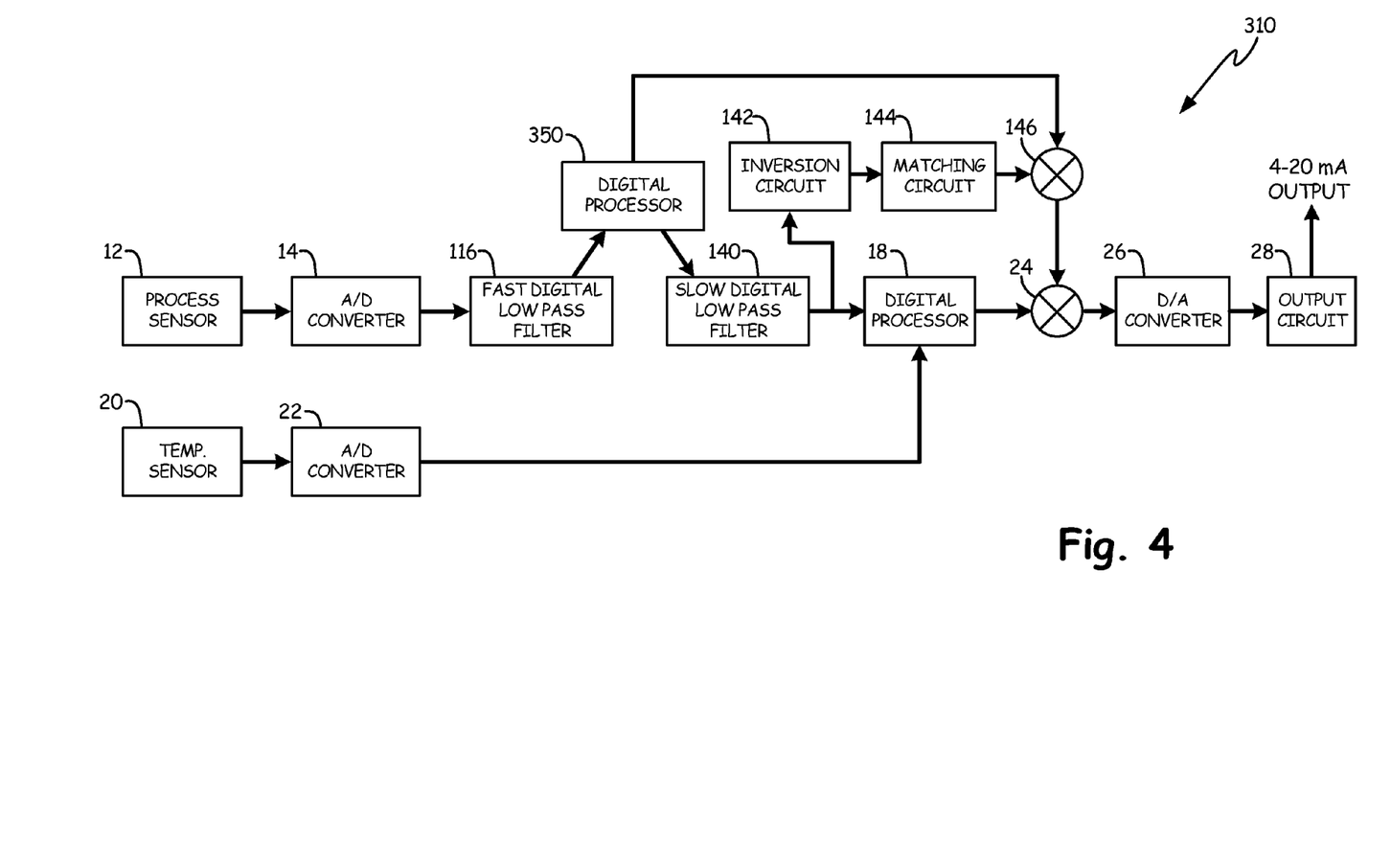
FIG. 4 is a block diagram of a process transmitter illustrating another embodiment of the present invention.

As noted above in reference to FIG. 1, the dynamic portion of the process signal typically has a required maximum total error of 5% of span. This level of performance is easily provided in the uncompensated signal from many process sensors. However, in some embodiments of the present invention, the uncompensated signal from process sensor 12 may not provide a level of performance sufficient to meet the required maximum total error of the dynamic portion of the process signal. FIG. 4 is a block diagram of another digitally compensated process transmitter embodying the present invention. In contrast to the embodiment of FIGS. 2A-2C, the embodiment of FIG. 4 includes at least partial digital compensation on all signal paths. The embodiment of FIG. 4 is identical to the embodiment illustrated in FIGS. 2A-2C, except for the addition of digital processor 350. As shown in FIG. 4, process transmitter 310 includes digital processor 350 which connects fast digital low pass filter 116 to both slow digital low pass filter 140 and intermediate summing circuit 146. Digital processor 350 provides partial digital compensation along first signal path 132, second signal path 134, and third signal path 136. First signal path 132, second signal path 134, and third signal path 136 are as described above in reference to FIGS. 2A-2C.

Operation for process transmitter 310 is identical to that for process transmitter 110 described above in reference to FIGS. 2A-2C, except that the fast filtered process signal from fast digital low pass filter 116 is partially digitally compensated to a level of performance sufficient to meet the required maximum total error of the dynamic portion of the process signal for transmitter 310. Digital processor 350 is typically a microprocessor or a portion of an integrated circuit. Like digital processor 18, digital processor 350 executes a correction algorithm to digitally compensate the process signal by at least one of linearization, line pressure compensation, and temperature compensation. However, because the digital compensation provided by digital processor 350 is only a partial compensation, not the full digital compensation provided by digital processor 18, the correction algorithm executed by digital processor 350 is significantly less powerful than that executed by digital processor 18. Thus, the computational burden of digital processor 350 is significantly less than that of digital processor 18.

Figure 5:
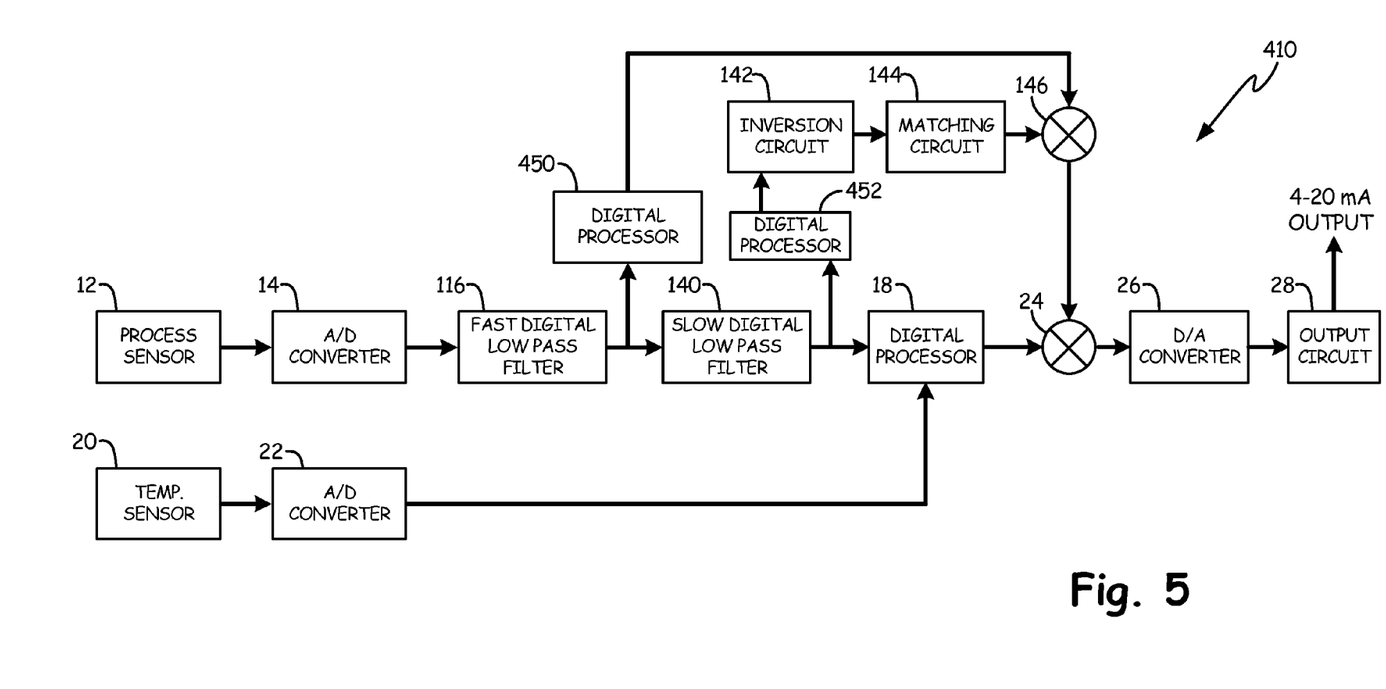
FIG. 5 is a block diagram of a process transmitter illustrating another embodiment of the present invention.

FIG. 5 illustrates an alternative to the embodiment of FIG. 4 for providing partial digital compensation of the process signal to produce a level of performance sufficient to meet a required maximum total error for the dynamic portion of the process signal for a transmitter. The embodiment of FIG. 5 is identical to the embodiment illustrated in FIGS. 2A-2C, except for the addition of digital processors 450 and 452. As shown in FIG. 5, process transmitter 410 includes digital processor 450 which connects fast digital low pass filter 116 to intermediate summing circuit 146. Process transmitter 410 also includes digital processor 452 which connects slow digital low pass filter 140 to inversion circuit 142. Digital processor 450 provides partial digital compensation along second signal path 134. Digital processor 452 provides partial digital compensation along third signal path 136. In contrast to the embodiment of FIG. 4, there is no partial digital compensation along first signal path 132 ahead of digital processor 18. First signal path 132, second signal path 134, and third signal path 136 are as described above in reference to FIGS. 2A-2C.

Operation for process transmitter 410 is identical to that for process transmitter 110 described above in reference to FIGS. 2A-2C, except that the fast filtered process signal at intermediate summing circuit 146 is partially digitally compensated to a level of performance sufficient to meet the required maximum total error of the dynamic portion of the process signal for transmitter 410. Likewise, the slow filtered process signal from slow digital low pass filter 140 is partially digitally compensated to a level of performance sufficient to meet the required maximum total error of the dynamic portion of the process signal for transmitter 410. Digital processors 450 and 452 are typically a microprocessor or a portion of an integrated circuit. Like digital processor 350 described above in reference to FIG. 4, digital processors 450 and 452 executes a correction algorithm to partially digitally compensate the process signal by at least one of linearization, line pressure compensation, and temperature compensation. As with digital processor 350, the correction algorithms executed by digital processors 450 and 452 are significantly less powerful than that executed by digital processor 18. Thus, the computational burden of digital processors 450 and 452 are significantly less than that of digital processor 18.

The embodiments of FIGS. 4 and 5 include all of the advantages of the embodiments described above in reference to FIGS. 1, 2A-2B, and 3. Importantly, in the embodiments of FIGS. 4 and 5, these benefits accrue even if the uncompensated signal from process sensor 12 does not provide a level of performance sufficient to meet the required maximum total error of the dynamic portion of the process signal for process transmitter 310 or 410.

Process transmitters embodying the present invention offer the static performance of a digitally compensated device and the dynamic performance of an all analog device that is nearly free of dead time. The use of an all-digital filtering scheme produces an excellent dynamic response to changes in a sensed process parameter, while conserving computational resources and simplifying output scaling. The all-digital architecture is a cost-effective way to provide the fast dynamic response of an analog transmitter, the low total error of a digitally compensated transmitter, and a dynamic response closely matching the sensor output.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process transmitter comprising:
   a sensor for producing a process signal that is a function of a process parameter;
   a first signal path in which the process signal is digitally compensated to produce a digitally compensated process signal;
   a second signal path in which the process signal is digitally filtered to produce a digitally filtered process signal and subject to less delay than the first signal path; and
   an output summing circuit for summing the digitally compensated process signal and the digitally filtered process signal to produce a fast digital compensated process signal, wherein the second signal path is synchronized to the first signal path so that a decaying portion of the digitally filtered process signal cancels out a decaying portion of the digitally compensated process signal when summed at the output summing circuit.

2. The process transmitter of claim 1, further comprising:
   a digital-to-analog converter in which the fast digital compensated process signal is converted to an analog compensated process signal; and
   an output circuit for producing a transmitter output responsive to the analog compensated process signal.

3. The process transmitter of claim 1, wherein the second signal path includes a digital band pass filter.

4. The process transmitter of claim 1, wherein the digital compensation of the process signal to produce the digitally compensated process signal includes digital compensation for at least one of ambient temperature, linearity, and line pressure.

5. The process transmitter of claim 1, further comprising:
   a temperature sensor for producing an analog temperature signal that is a function of an ambient temperature;
   a temperature signal path in which the analog temperature signal is converted to a digital temperature signal; and
   the process signal is digitally compensated at least in part in response to the digital temperature signal to produce the digitally compensated process signal.

6. A process transmitter further comprising:
   a sensor for producing a process signal that is a function of a process parameter;
   a first signal path in which the process signal is digitally compensated to produce a digitally compensated process signal;
   a second signal path in which the process signal is digitally filtered to produce a fast digitally filtered process signal and subject to less delay than the first signal path;
   a third signal path in which the process signal is digitally filtered and inverted to produce a delayed inverted process signal, the third signal path subject to greater delay than the second signal path;
   an intermediate summing circuit for adding the delayed inverted process signal to the second path to produce a digitally filtered process signal; and an output summing circuit for summing the digitally compensated process signal and the digitally filtered process signal to produce a fast digital compensated process signal.

7. The process transmitter of claim 6, further comprising:
a first digital low pass filter to digitally filter the process signal for the first signal path, the second signal path, and the third signal path; and
a second digital low pass filter to digitally filter the process signal for the first signal path and the third signal path; the second digital low pass filter having a lower update frequency than the first digital low pass filter.

8. The process transmitter of claim 7, wherein the delay of the process signal along the third signal path is synchronized to the delay of the process signal along the first signal path.

9. The process transmitter of claim 8, further comprising:
a digital-to-analog converter in which the fast digital compensated process signal is converted to an analog compensated process signal; and
an output circuit for producing a transmitter output responsive to the analog compensated process signal.

10. A process transmitter comprising:
a sensor for producing a process signal that is a function of a process parameter;
an analog-to-digital converter to digitize the process signal to produce a digital process signal;
a first digital low pass filter to filter the digital process signal to produce a fast filtered process signal;
a second digital low pass filter to filter the fast filtered process signal to produce a slow filtered process signal, the second digital low pass filter having a lower update frequency than the first digital low pass filter;
a first digital processor to digitally compensate the slow filtered process signal to produce a digitally compensated process signal; the first digital processor creating a delay in the digitally compensated process signal;
an inversion circuit to invert the slow filtered process signal to produce an inverted process signal;
a matching circuit to create a delay in the inverted process signal to produce a delayed inverted process signal;
an intermediate summing circuit to sum the fast filtered process signal and the delayed inverted process signal to produce a digitally filtered process signal; and
an output summing circuit to sum the digitally filtered process signal and the digitally compensated process signal to produce a fast digital compensated process signal.

11. The process transmitter of claim 10, wherein the digital processor controls the delay of the matching circuit to synchronize the delayed inverted process signal with the digitally compensated process signal.

12. The process transmitter of claim 10, further comprising:
a digital-to-analog converter in which the fast digital compensated process signal is converted to an analog compensated process signal; and
an output circuit for producing a transmitter output responsive to the analog compensated process signal.

13. The process transmitter of claim 10, further comprising:
a second digital processor to digitally compensate the fast filtered process signal, the second digital processor digitally compensating the process signal less than the first digital processor compensates the slow filtered process signal.

14. The process transmitter of claim 10, further comprising:

a second digital processor to digitally compensate a portion of the fast filtered process signal summed at the intermediate summing circuit; and
a third digital processor to digitally compensate a portion of the slow filtered process signal inverted at the inversion circuit;
wherein the second digital processor and the third digital processor each digitally compensate the process signal less than the first digital processor compensates the slow filtered process signal.

15. The process transmitter of claim 10, further comprising:
a temperature sensor for producing a temperature signal that is a function of an ambient temperature;
a temperature analog-to-digital converter to digitize the temperature signal to produce a digital ambient temperature signal; and
the digital processor employs the digital ambient temperature signal to digitally compensate the slow filtered process signal to produce the digitally compensated process signal.

16. A method for producing process transmitter output having an overall dynamic response closely following a sensed process parameter:
producing an analog process signal that is a function of the sensed process parameter;
digitizing the analog process signal to produce a digital process signal;
compensating the digital process signal to produce a digitally compensated process signal;
filtering the digital process signal to produce a digitally filtered process signal;
summing the digitally compensated process signal and the digitally filtered process signal to produce a fast digital compensated process signal, wherein the digitally filtered process signal is synchronized to the digitally compensated process signal so that a decaying portion of the digitally filtered process signal cancels out a decaying portion of the digitally compensated processed signal when they are summed to produce the fast digital compensated process signal; and
producing a process transmitter output responsive to the fast digital compensated process signal.

17. The method of claim 16, wherein compensating the digital process signal includes compensating for at least one of ambient temperature, linearity, and line pressure.

18. The method of claim 16, further comprising:
producing an analog ambient temperature signal that is a function of a sensed ambient temperature; and
compensating the digital process signal includes compensating the digital process signal in response to the sensed ambient temperature.

19. A method for producing process transmitter output having an overall dynamic response closely following a sensed process parameter:
producing an analog process signal that is a function of the sensed process parameter;
digitizing the analog process signal to produce a digital process signal;
compensating the digital process signal to produce a digitally compensated process signal;
filtering the digital process signal to produce a digitally filtered process signal;
summing the digitally compensated process signal and the digitally filtered process signal to produce a fast digital compensated process signal; and producing a process transmitter output responsive to the fast digital compensated process signal;

wherein filtering the digital process signal to produce a digitally filtered process signal includes:
- filtering the digital process signal with a fast digital low pass filter to produce a fast filtered process signal;
- filtering the fast filtered process signal with a slow digital low pass filter to produce a slow filtered process signal, the slow digital low pass filter having a lower update frequency than the fast digital low pass filter;
- delaying and inverting the slow filtered process signal to produce a delayed inverted process signal; and
- summing the fast filtered process signal and the delayed inverted process signal to produce the digitally filtered process signal; and wherein compensating the digital process signal to produce a digitally compensated process signal includes:
- filtering the digital process signal with the fast digital low pass filter to produce the fast filtered process signal;
- filtering the fast filtered process signal with the slow digital low pass filter to produce a slow filtered process signal; and
- digitally compensating the slow filtered process signal to produce the digitally compensated process signal.

20. The method of claim 19, wherein delaying and inverting the slow filtered process signal includes synchronizing the delayed inverted process signal with the digitally compensated process signal.

* * * * *